(12) United States Patent
Kawarada

(10) Patent No.: US 8,203,645 B2
(45) Date of Patent: Jun. 19, 2012

(54) IMAGE-PICKUP APPARATUS AND CONTROL METHOD THEREOF WITH IMAGE GENERATION BASED ON A DETECTED SPATIAL FREQUENCY

(75) Inventor: Masahiro Kawarada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 12/602,797

(22) PCT Filed: Aug. 1, 2008

(86) PCT No.: PCT/JP2008/064264
§ 371 (c)(1),
(2), (4) Date: Dec. 3, 2009

(87) PCT Pub. No.: WO2009/022634
PCT Pub. Date: Feb. 19, 2009

(65) Prior Publication Data
US 2010/0214452 A1    Aug. 26, 2010

(30) Foreign Application Priority Data

Aug. 10, 2007  (JP) .................. 2007-209697
Aug. 10, 2007  (JP) .................. 2007-209698
Aug. 10, 2007  (JP) .................. 2007-209699

(51) Int. Cl.
G03B 13/00    (2006.01)

(52) U.S. Cl. ........ 348/354; 348/345; 348/346; 348/347; 348/348; 348/349

(58) Field of Classification Search .................. None
See application file for complete search history.

(56) References Cited

U.S. PATENT DOCUMENTS

| | | | | |
|---|---|---|---|---|
| 6,829,008 B1 * | 12/2004 | Saga et al. | ..................... | 348/302 |
| 2007/0196089 A1 * | 8/2007 | Yamaguchi | ..................... | 396/56 |
| 2007/0196091 A1 * | 8/2007 | Yamaguchi | ..................... | 396/95 |
| 2007/0201857 A1 * | 8/2007 | Kitamura | ..................... | 396/222 |
| 2007/0237512 A1 * | 10/2007 | Kusaka | ..................... | 396/111 |
| 2007/0242142 A1 * | 10/2007 | Okazaki | ..................... | 348/239 |
| 2008/0068466 A1 * | 3/2008 | Tamaru et al. | ........... | 348/208.99 |
| 2008/0187185 A1 * | 8/2008 | Misawa et al. | ................ | 382/118 |
| 2011/0008031 A1 * | 1/2011 | Kusaka | ..................... | 396/100 |
| 2011/0261230 A1 * | 10/2011 | Hayashi et al. | .......... | 348/231.99 |

FOREIGN PATENT DOCUMENTS

| | | |
|---|---|---|
| JP | 2000-156823 A | 6/2000 |
| JP | 2002-320236 A | 10/2002 |
| JP | 2006-154065 A | 6/2006 |
| JP | 2007-103590 A | 4/2007 |

* cited by examiner

*Primary Examiner* — Lin Ye
*Assistant Examiner* — John H Morehead, III
(74) *Attorney, Agent, or Firm* — Fitzpatrick, Cella, Harper & Scinto

(57) ABSTRACT

An image-pickup apparatus includes an image-pickup element including first pixels photoelectrically converting an object image formed by a light flux from an image-pickup optical system and second pixels including plural focus detection pixels photoelectrically converting a light flux divided from the light flux from the image-pickup optical system, a focus detector detecting a focus state of the image-pickup optical system based on outputs from the second pixels, a frequency component detector detecting a spatial frequency component of the object image formed on the first pixels, an image generator generating, based on outputs from the first pixels, a partial image corresponding to the second pixels of an image obtained by an output from the image-pickup element. The apparatus includes a controller switching whether or not to cause the image generator to generate the partial image according to the spatial frequency component detected by the frequency component detector.

14 Claims, 11 Drawing Sheets

PRIOR ART

| R | G | R | G | R | G | R | G |
|---|---|---|---|---|---|---|---|
| G | B | G | B | G | B | G | B |
| R | G | R | G | R | G | R | G |
| S1 | B | S1 | B | S1 | B | S1 | B |
| R | G | R | G | R | G | R | G |
| S2 | B | S2 | B | S2 | B | S2 | B |
| R | G | R | G | R | G | R | G |
| G | B | G | B | G | B | G | B |

} NORMAL IMAGE-PICKUP PIXEL LINES

} FIRST FOCUS DETECTION PIXEL LINES

} SECOND FOCUS DETECTION PIXEL LINES

} NORMAL IMAGE-PICKUP PIXEL LINES

FIG. 5

PRIOR ART

IMAGE-PICKUP APPARATUS AND CONTROL METHOD THEREOF WITH IMAGE GENERATION BASED ON A DETECTED SPATIAL FREQUENCY

TECHNICAL FIELD

The present invention relates to an image-pickup apparatus such as a digital camera or a video camera, and more particularly to an image-pickup apparatus that performs focus detection based on an output from an image-pickup element.

BACKGROUND ART

Japanese Patent Laid-Open No. 2000-156823 discloses an image-pickup apparatus, in which some pixels (focus detection pixels) included in an image-pickup element used in the apparatus are provided with different optical characteristics from those of other pixels to perform focus detection based on outputs from the focus detection pixels.

In the image-pickup apparatus disclosed in Japanese Patent Laid-Open No. 2000-156823, plural focus detection pixels paired with each other are arranged in part of the image-pickup element. FIG. 5 shows one example of a pixel arrangement of the image-pickup element in which the focus detection pixels are arranged in some of the lines of the pixel matrix.

In FIG. 5, reference symbols R, G, and B respectively represent normal image-pickup pixels provided with a red filter, a green filter, and a blue filter. Reference symbols S1 and S2 respectively represent first focus detection pixels and second focus detection pixels which have different optical characteristics from those of the image-pickup pixels.

FIG. 6 shows the structure of a first focus detection pixel S1. In FIG. 6, a microlens 501 is formed on a light-entrance side of the first focus detection pixel. Reference numeral 502 denotes a planar layer forming a flat surface for providing the microlens 501.

Reference numeral 503 denotes a light-shielding layer, which has an aperture decentered to one direction relative to the center O of a photoelectric conversion area 504 of the first focus detection pixel S1.

FIG. 7 shows the structure of a second focus detection pixel S2. In FIG. 7, a microlens 601 is formed on a light-entrance side of the second focus detection pixel. Reference numeral 602 denotes a planar layer forming a flat surface for providing the microlens 601.

Reference numeral 603 denotes a light-shielding layer, which has an aperture decentered relative to the center O of a photoelectric conversion area 604 of the second focus detection pixel S2. The aperture of the light-shielding layer 603 is decentered in a direction opposite to that of the light-shielding layer 503 provided in the first focus detection pixel S1. That is, the light-shielding layers 503 and 603 have their apertures at symmetric positions relative to the optical axis of the microlenses of the first and second focus detection pixels S1 and S2.

With such a structure, viewing an image-pickup optical system from the first focus detection pixel S1 and from the second focus detection pixel S2 is equivalent to symmetrically dividing a pupil of the image-pickup optical system.

In FIG. 5, in the line containing the first focus detection pixels S1 and in the line containing the second focus detection pixels S2, two images are formed which are more approximate to each other as the number of pixels in the image-pickup element increases. When the image-pickup optical system is in an in-focus state relative to an object, outputs (image signals) obtained from the lines respectively containing the first and second focus detection pixels S1 and S2 match with each other.

On the other hand, when the image-pickup optical system is out of focus, a phase difference is generated in the image signals obtained from the lines respectively containing the first and second focus detection pixels S1 and S2. Directions of the phase difference in a front focus state and in a rear focus state are opposite to each other.

FIGS. 8A and 8B show the relationships between the focus state and the phase difference. In these drawings, both focus detection pixels S1 and S2 shown in FIG. 7 are illustrated closer to each other and designated by symbols A and B. The image-pickup pixels are omitted.

The light flux from a specific point on the object is divided into a light flux ΦLa and a light flux ΦLb, the former entering a focus detection pixel A through a divided pupil corresponding to the focus detection pixel A and the latter entering a focus detection pixel B through a divided pupil corresponding to the focus detection pixel B. These light fluxes come from the identical point on the object. Therefore, when the image-pickup optical system is in an in-focus state, they pass through the same microlens and reach one point on the image-pickup element as shown in FIG. 8A. Accordingly, the image signals respectively obtained from the lines containing the first focus detection pixels A (S1) and second focus detection pixels B (S2) match with each other.

On the other hand, as shown in FIG. 8B, when the image-pickup optical system is out of focus by x, the reaching positions of both light fluxes ΦLa and ΦLb are offset from each other by a change in the incident angle of the light fluxes ΦLa and ΦLb onto the microlenses. Therefore, a phase difference is generated between the image signals respectively obtained from the lines containing the first focus detection pixels A (S1) and second focus detection pixels B (S2).

The image-pickup apparatus disclosed in Japanese Patent Laid-Open No. 2000-156823 performs the focus detection with the image-pickup element utilizing the above principle.

However, when obtaining a still image using such an image-pickup element containing the focus detection pixels, pixel data corresponding to the positions of the focus detection pixels are lost. Since the focus detection pixel has a different viewing field from that of the normal image-pickup pixel, using the signal obtained from the focus detection pixel as an image signal for a still image will cause discontinuity between the signal from the focus detection pixel and the signal from peripheral pixels thereof, which makes it impossible to obtain a good image.

To solve such a problem, in the image-pickup apparatus disclosed in Japanese Patent Laid-Open No. 2000-156823, image signals corresponding to signals from the focus detection pixels are interpolated using image signals from peripheral pixels thereof.

In the pixel arrangement of the image-pickup element shown in FIG. 5, interpolating data from the peripheral pixels are inserted into portions of a picked-up image corresponding to the focus detection pixels S1 and S2. In FIG. 5, the R, G, and B pixels for image pickup are aligned in a Beyer arrangement, and some of the G pixels are replaced by the focus detection pixels S1 and S2. As data of the G pixel which is lost because of the presence of the focus detection pixels S1 and S2, synthesized pixel data generated from data of four G pixels located obliquely adjacent to the G pixel is provided.

However, the interpolation of the image signals of the focus detection pixels by using the image signals of the peripheral pixels thereof as disclosed in Japanese Patent Laid-Open No. 2000-156823 may cause a decrease in sharpness in the image obtained by these peripheral pixels as compared to the image obtained by pixels of other areas.

When receiving light forming an object image having a low spatial frequency, the continuity of an image signal from the focus detection pixel may be low relative to image signals from peripheral image-pickup pixels thereof because of the difference in viewing field between the focus detection pixel and the peripheral image-pickup pixels. Therefore, it is preferable to interpolate the image signal at the position of the focus detection pixel based on the image signals from the peripheral image-pickup pixels. In this case, because the spatial frequency of the object image is low, a decrease in sharpness due to the interpolation is hardly prominent.

On the other hand, when receiving light forming an object image having a high spatial frequency, the continuity of the image signal at the position of the focus detection pixel is originally low relative to the image signals from the peripheral image-pickup pixels thereof. Therefore, a decrease in sharpness due to the interpolation becomes prominent. Accordingly, as the number of the focus detection pixels is increased, image areas with the sharpness lowered due to the interpolation are increased, and the quality of the obtained image is lowered.

When phase difference sensors with different viewing fields are provided on the image-pickup element and focus detection is performed based on the phase difference obtained by these phase difference sensors, the sensors are provided with an aperture on its front face for performing pupil division. The phase difference sensors are not provided with a color filter on its light-entrance surface. Therefore, an image signal output from a phase difference sensor has a different signal level from those of the pixels located in the periphery thereof, which makes it impossible to use the image signal output from the phase difference sensor as it is for still image data.

Incidentally, it is generally known that an image signal at a focus position with a large defocus amount contains a small high-frequency component. In contrast, an image signal at a focus position with a small defocus amount contains a high-frequency component that is the largest in the defocus range.

DISCLOSURE OF INVENTION

The present invention provides an image-pickup apparatus capable of obtaining an image with high sharpness even when the number of the focus detection pixels in the image-pickup element is increased, and a control method thereof.

The present invention provides, according to an aspect thereof, an image-pickup apparatus including an image-pickup element that includes first pixels photoelectrically converting an object image formed by a light flux from an image-pickup optical system, and second pixels including plural focus detection pixels photoelectrically converting a light flux divided from the light flux from the image-pickup optical system, a focus detector that detects a focus state of the image-pickup optical system based on outputs from the second pixels, a frequency component detector that detects a spatial frequency component of the object image formed on the first pixels, an image generator that generates, based on outputs from the first pixels, a partial image corresponding to the second pixels of an image obtained by an output from the image-pickup element, and a controller that switches whether or not to cause the image generator to generate the partial image in accordance with the spatial frequency component detected by the frequency component detector.

The present invention provides, according to another aspect thereof, a method of controlling an image-pickup apparatus that includes an image-pickup element including first pixels photoelectrically converting an object image formed by a light flux from an image-pickup optical system, and second pixels including plural focus detection pixels photoelectrically converting a light flux divided from the light flux from the image-pickup optical system. The method includes a step of detecting a focus state of the image-pickup optical system based on outputs from the second pixels, a step of detecting a spatial frequency component of the object image formed on the first pixels, a step of generating, based on outputs from the first pixels, a partial image corresponding to the second pixels of an image obtained by an output from the image-pickup element, and a step of switching whether or not to generate the partial image in accordance with the detected spatial frequency component.

The present invention provides, according to still another aspect thereof, an image-pickup apparatus including an image-pickup element that includes first pixels photoelectrically converting an object image formed by a light flux from an image-pickup optical system, and second pixels including plural focus detection pixels photoelectrically converting a light flux divided from the light flux from the image-pickup optical system, a focus detector that detects a focus state of the image-pickup optical system based on outputs from the second pixels, an image generator that generates, based on outputs from the first pixels, a partial image corresponding to the second pixels of an image obtained by an output from the image-pickup element, and a controller that switches whether or not to cause the image generator to generate the partial image in accordance with the focus state detected by the focus detector.

The present invention provides, according to still another aspect thereof, a method of controlling an image-pickup apparatus that includes an image-pickup element including first pixels photoelectrically converting an object image formed by a light flux from an image-pickup optical system, and second pixels containing plural focus detection pixels photoelectrically converting a light flux divided from the light flux from the image-pickup optical system. The method includes a step of detecting a focus state of the image-pickup optical system based on outputs from the second pixels, a step of generating, based on outputs from the first pixels, a partial image corresponding to the second pixels of an image obtained by an output from the image-pickup element, and a step of switching whether or not to generate the partial image in accordance with the focus state detected by the focus detector.

The present invention provides, according to yet still another aspect thereof, an image-pickup apparatus including an image-pickup element that includes first pixels photoelectrically converting an object image formed by a light flux from an image-pickup optical system, and second pixels containing plural focus detection pixels photoelectrically converting a light flux divided from the light flux from the image-pickup optical system, a focus detector that detects a focus state of the image-pickup optical system based on outputs from the second pixels, a frequency component detector that detects a spatial frequency component of the object image formed on the first pixels, an image generator that generates, based on outputs from the first pixels, a partial image corresponding to the second pixels of an image obtained by an output from the image-pickup element, and a controller that switches whether or not to cause the image generator to generate the partial image in accordance with the detected focus state when the focus detector has detected the focus state, and switches whether or not to cause the image generator to generate the partial image in accordance with the spatial frequency component detected by the frequency component detector when the focus detector has not detected the focus state.

The present invention provides, according to further another aspect thereof, a method of controlling an image-pickup apparatus that includes an image-pickup element including first pixels photoelectrically converting an object image formed by a light flux from an image-pickup optical system, and second pixels containing plural focus detection pixels photoelectrically converting a light flux divided from the light flux from the image-pickup optical system. The method includes a step of detecting a focus state of the image-pickup optical system based on outputs from the second pixels, a step of detecting a spatial frequency component of the object image formed on the first pixels, a step of generating, based on outputs from the first pixels, a partial image corresponding to the second pixels of an image obtained by an output from the image-pickup element, and a step of switching whether or not to generate the partial image in accordance with the detected focus state when the focus state has been detected, and switches whether or not to generate the partial image in accordance with the detected spatial frequency component when the focus state has not been detected.

Other aspects of the present invention will be apparent from the embodiments described below with reference to the drawings.

BRIEF DESCRIPTION OF THE DRAWINGS

FIG. 5 is a diagram showing the arrangement of image-pickup pixels and focus detection pixels.

BEST MADE FOR CARRYING OUT THE INVENTION

Exemplary embodiments of the present invention will be described below with reference to the accompanied drawings.

Embodiment 1

Figure 1:
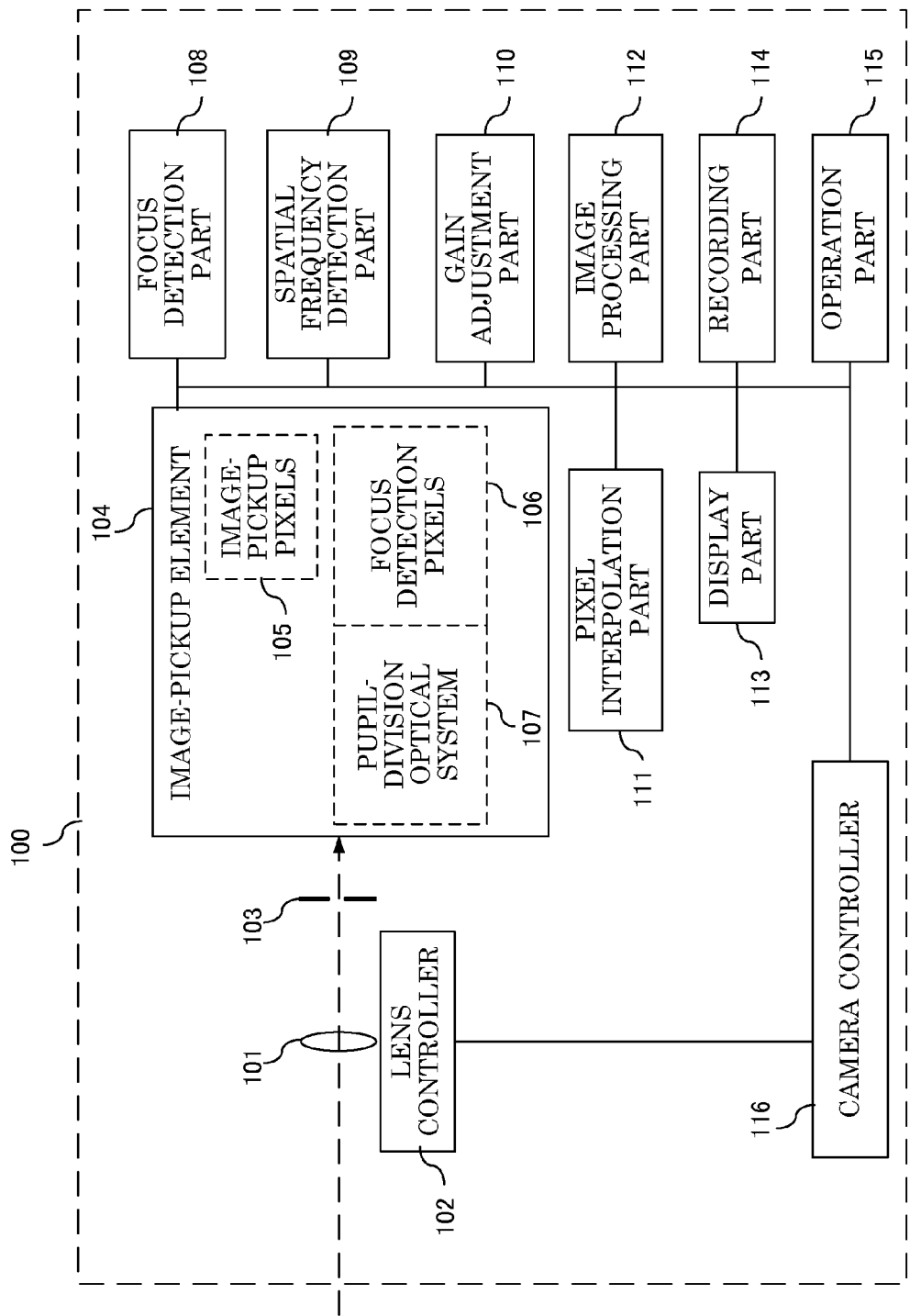
FIG. 1 is a block diagram showing the configuration of a digital camera that is a first embodiment (Embodiment 1) of the present invention.

FIG. 1 shows the configuration of a digital camera as an image-pickup apparatus that is a first embodiment (Embodiment 1) of the present invention.

The camera 100 includes an image-pickup optical system 101 that forms an object image of an object with a light flux, a lens controller 102 for controlling the position of a focus lens (not shown) included in the image-pickup optical system 101, and an aperture stop 103 for adjusting the amount of light passing through the image-pickup system 101. The camera 100 also includes an image-pickup element 104 as a photoelectric conversion element, which is constituted by a CMOS sensor. The object image is formed on a light receiving surface of the image-pickup element 104 with a light flux from the image-pickup optical system 101.

The image-pickup element 104 includes a group of image-pickup pixels (first pixels) 105 constituted by plural image-pickup pixels for photoelectrically converting an object image formed by the image-pickup optical system 101, each of the image-pickup pixels respectively having a color filter of one of R, G, and B. The image-pickup pixels 105 output image signals that are used for generating an image of the object. The image-pickup element 104 also includes a group of focus detection pixels (second pixels) 106 that output a pair of image signals which is used for detection of a focus state (focus detection) of the image-pickup optical system 101.

The group of the focus detection pixels 106 includes plural first focus detection pixels and plural second focus detection pixels that photoelectrically convert light fluxes pupil-divided by a pupil-division optical system 107 to be described later. The plural first focus detection pixels form a first phase difference sensor, and the plural second focus detection pixels form a second phase difference sensor. The first phase difference sensor outputs one of the above-described pair of image signals, and the second phase difference sensor outputs the other one of the above-described pair of image signals.

The image-pickup element 104 also includes the pupil-division optical system 107 for causing the pupil-divided light fluxes of the light flux from the image-pickup optical system 101 to respectively enter the first and second phase difference sensors.

Figure 2:
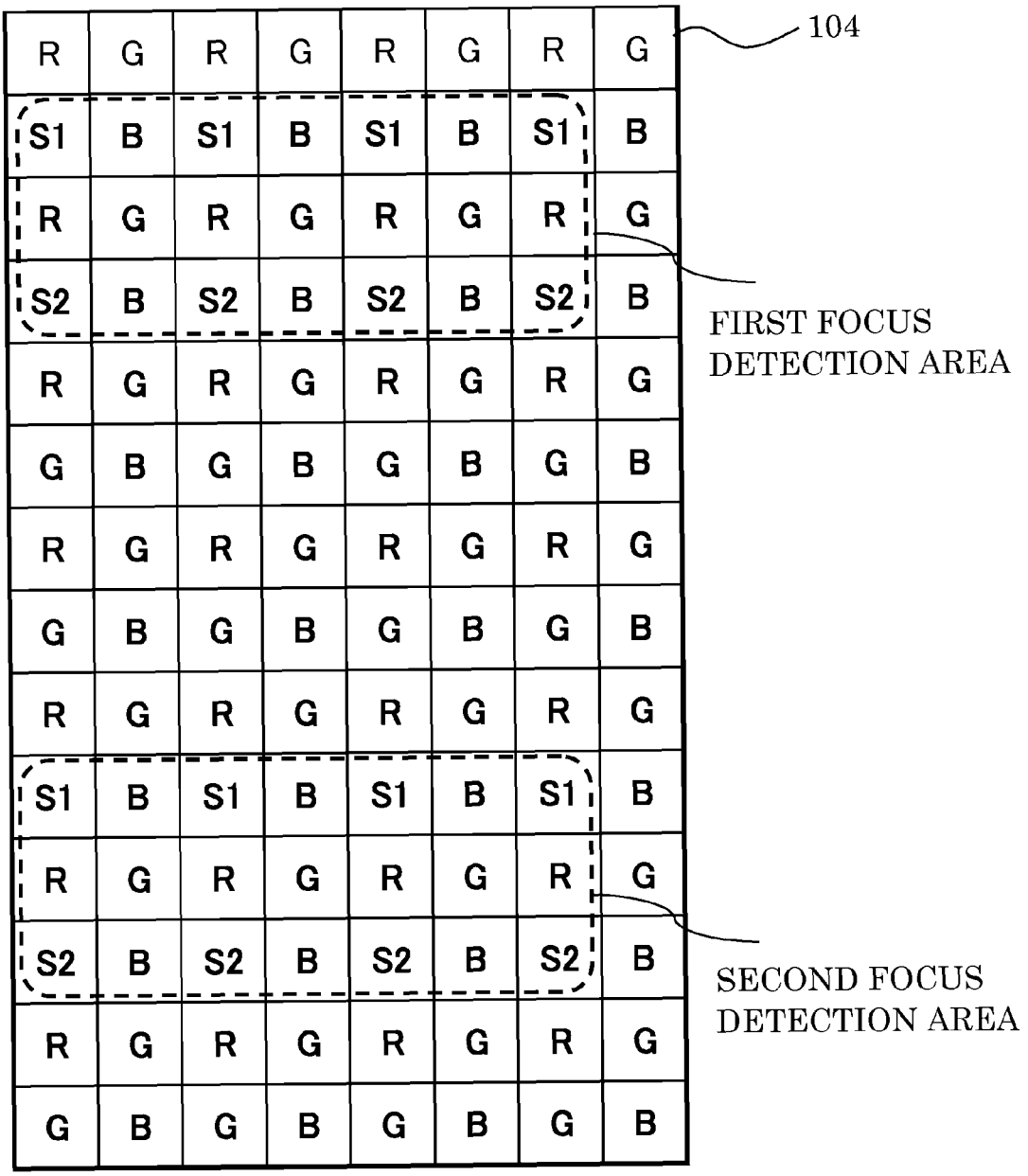
FIG. 2 is a diagram showing the arrangement of image-pickup pixels and focus detection pixels in Embodiment 1.

FIG. 2 shows the pixel arrangement of the image-pickup element 104 used in this embodiment. In FIG. 2, the first focus detection pixels and the second focus detection pixels in the focus detection pixels 106 are designated by S1 and S2, respectively.

Figure 6:
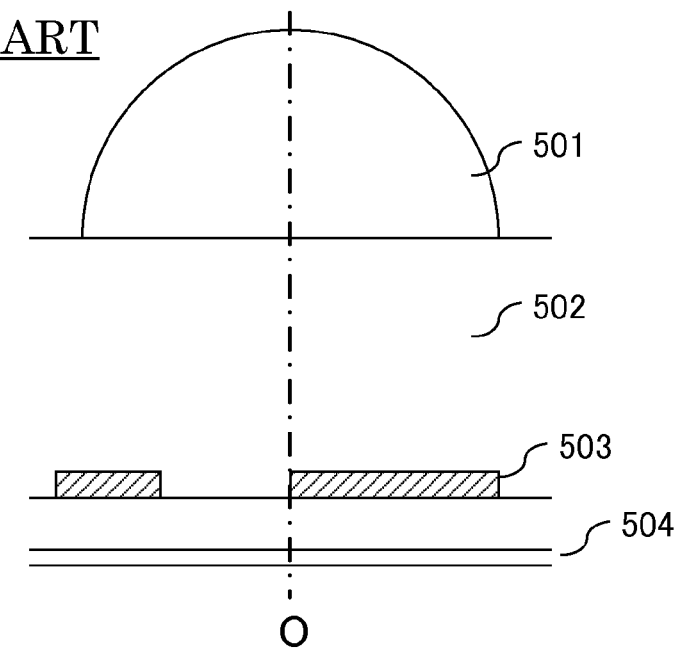
FIG. 6 is a diagram showing the structure of a first focus detection pixel.
Figure 7:
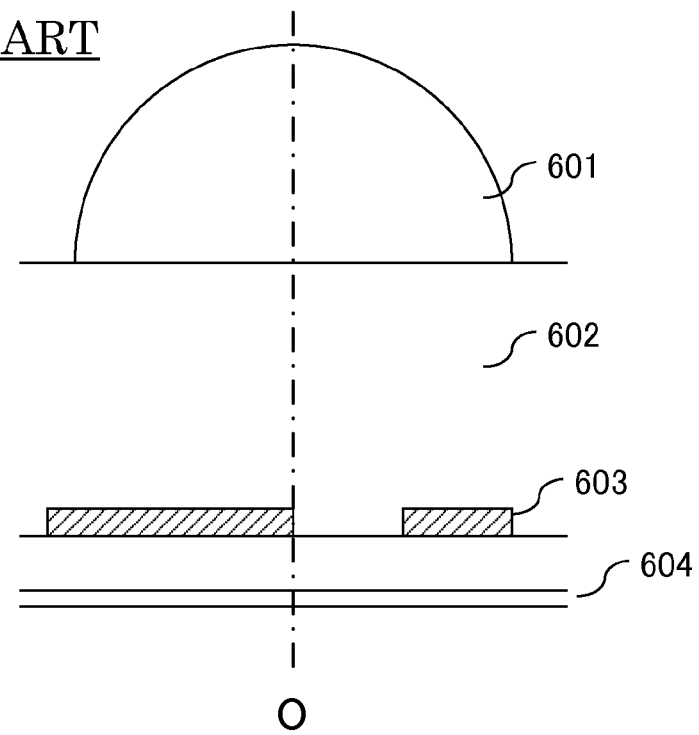
FIG. 7 is a diagram showing the structure of a second focus detection pixel.
Figure 8A:
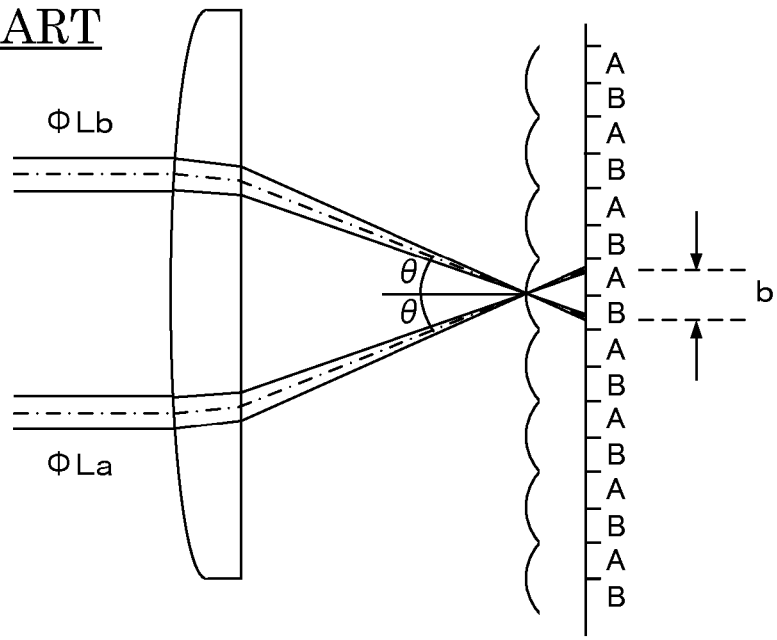
FIG. 8A is a schematic diagram explaining a phase difference in image signals in accordance with a focus state (in-focus state).
Figure 8B:
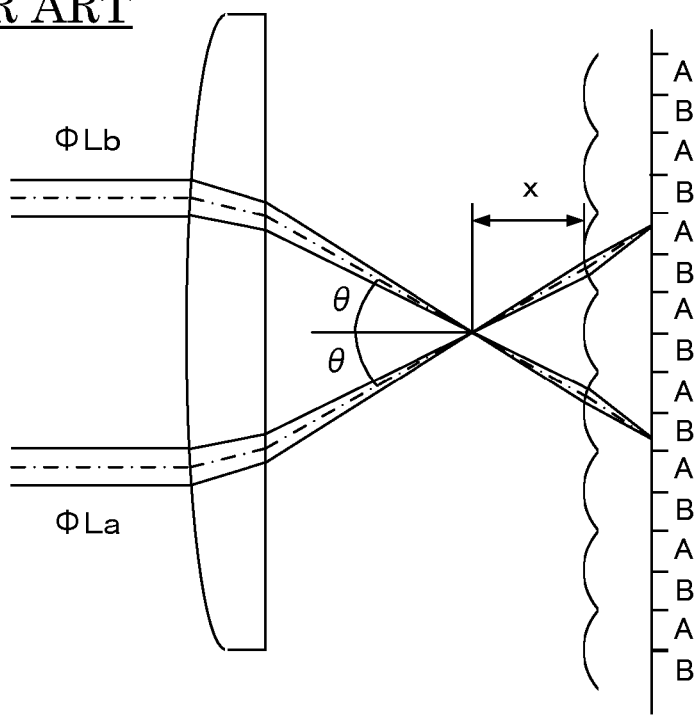
FIG. 8B is a schematic diagram explaining a phase difference in image signals in accordance with a focus state (front focus state).

The structure of the first and second focus detection pixels is similar to those shown in FIGS. 6 and 7. That is, the first and second focus detection pixels S1 and S2 are configured such that their respective light-shielding layers have apertures at symmetric positions relative to an optical axis of microlenses that serve as the pupil-division optical system 107.

In FIG. 2, a pixel line in which the first focus detection pixels S1 are discretely inserted forms the first phase difference sensor. A pixel line, which is disposed at a predetermined distance from the first phase difference sensor (the distance corresponding to one pixel in FIG. 2) and in which the second focus detection pixels S2 are discretely inserted, forms the second phase difference sensor. One area of the group of the focus detection pixels (second pixels) including the first and second phase difference sensors forms one focus detection area. In FIG. 2, a first focus detection area and a second focus detection area are arranged in an upper part and a lower part of the image-pickup element 104, respectively.

As shown in FIG. 1, the camera 100 includes a focus detection part (focus detector) 108 that determines a phase difference between the pair of image signals output from the first and second phase difference sensors in each focus detection area using correlation calculation.

Here, "the pair of image signals output from the first and second phase difference sensors (in other words, the pair of image signals output from the focus detection pixels 106)" is basically a pair of image signals generated only from the output signals from the focus detection pixels S1 and S2. The pair of image signals, however, may be generated from output signals from the entire group of the focus detection pixels.

The focus detection part 108 calculates, based on the phase difference, a defocus amount indicating a focus state of the image-pickup optical system 101 relative to the object whose optical image is formed on the focus detection area.

While the focus detection part 108 calculates the defocus amount in this embodiment, the apparatus may be configured such that the focus detection part 108 only calculates the phase difference in the image signals and the defocus amount is calculated based on the phase difference by a camera controller 116 which will be described later. In this embodiment, the focus state is described as the defocus amount, but instead, the phase difference may be taken as the focus state.

Thus, the focus detection part 108 performs focus detection (defocus amount calculation) separately for each focus detection area.

In each of the focus detection pixels 106 (first and second focus detection pixels S1 and S2), a viewing field is limited because of the light-shielding layer provided to each focus detection pixel as can be seen from FIGS. 6 and 7. Therefore, the level of image signals from the focus detection pixels 106 is different from (for example lower than) that of image signals output from plural pixels of the image-pickup pixels 105 located in the vicinity of the focus detection pixels 106 (hereinafter referred to as "adjacent pixels").

Accordingly, in order to make the level of the image signals from the focus detection pixels 106 closer to that of the image signals from the adjacent pixels, the camera 100 includes a gain adjustment part (gain adjuster) 110 that adjusts a gain for the image signals from the focus detection pixels 106.

Furthermore, the camera 100 includes a spatial frequency detection part (frequency component detector) 109 that detects intensity of a specific frequency component (high-frequency component) contained in the image signals from the adjacent pixels (image-pickup pixels 105). The high-frequency component represents a spatial frequency component of the object image formed on the adjacent pixels.

In addition, the camera 100 includes a pixel interpolation part (image generator) 111 that generates image data corresponding to the focus detection pixels 106 through interpolation based on outputs from the adjacent pixels. In other words, the pixel interpolation part 111 generates a partial image corresponding to the focus detection pixels 106 in the entire image obtained from the output from the image-pickup element 104, based on the outputs from the image-pickup pixels 105 (adjacent pixels).

The "image data (partial image) corresponding to the focus detection pixels 106" may be image data corresponding to an area covering the entire group of the focus detection pixels 106, or, image data for each of the first and second focus detection pixels S1 and S2.

The camera 100 also includes an image processing part 112 that performs image processing to the image signals output from the image-pickup pixels 105 such as gamma correction, white balance adjustment, resampling for display, image compression encoding and the like.

Furthermore, the camera 100 includes a display part 113 for displaying image data (still image data) output from the image processing part 112, and a recording part 114 for recording the image data on a recording medium such as a semiconductor memory or an optical disk. The camera 100 further includes an operation part 115 that enables a user to perform input operations, and a camera controller 116 for controlling the entire camera 100.

The camera controller 116 calculates a driving amount of a focus lens to obtain an in-focus state based on the defocus amount calculated by the focus detection part 108. The calculated driving amount is output to the lens controller 102, which moves the focus lens based on this driving amount. Autofocus (AF) is performed in this way to obtain the in-focus state of the image-pickup optical system 101.

Figure 3:
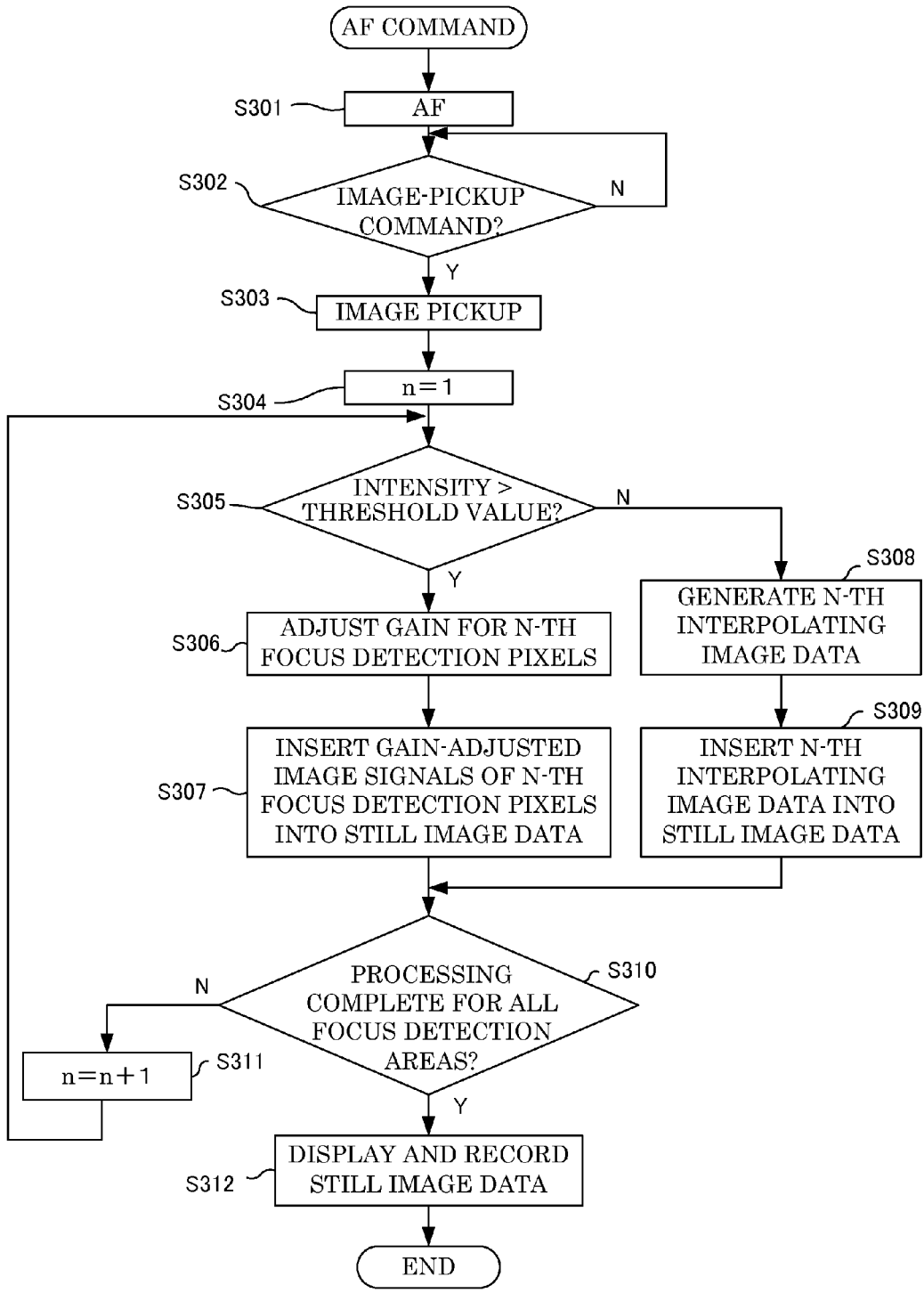
FIG. 3 is a flowchart showing the operation of the camera of Embodiment 1.

FIG. 3 shows the operation of the camera (mainly the operation of the camera controller 116) of this embodiment. This operation is executed according to a computer program stored in a memory (not shown) provided inside of the camera controller 116.

The camera controller 116 starts the operation from Step S301 when an AF command signal (for example, a signal output in response to a half-press operation of a release button, not shown) is input from the operation part 115. Although not particularly explained here, an image-pickup preparation operation including exposure calculation is performed concurrently with the AF operation.

In Step S301, the camera controller 116 causes the image-pickup element 104 to start charge accumulation of the focus detection pixels 106. After completing the charge accumulation, the camera controller 116 causes the focus detection pixels 106 to output image signals to the focus detection part 108. The focus detection part 108, as described above, calculates the defocus amount and then outputs it to the camera controller 116. The camera controller 116, as described above, calculates a driving amount of the focus lens and then outputs it to the lens controller 102 to move the focus lens toward an in-focus position.

After moving the focus lens, since exposure conditions may have changed because of a change in the object image, the exposure calculation is performed again at the new focus lens position. After that, the process proceeds to Step S302.

In Step S302, the camera controller 116 determines whether or not an image-pickup command signal (for example, a signal output in response to a full-press operation of the release button) has been input thereto from the operation part 115. If no image-pickup command signal has been input, the determination in this step is repeated. If, on the other hand, the image-pickup command signal has been input, the process proceeds to Step S303.

In Step S303, the camera controller 116 causes the image-pickup element 104 to start charge accumulation of the image-pickup pixels 105 and focus detection pixels 106 for image pickup to obtain an image (image data) of the object. After completing the charge accumulation, the camera controller 116 causes the image-pickup pixels 105 to output image signals to the spatial frequency detection part 109 and pixel interpolation part 111, and causes the focus detection pixels 106 to output image signals to the spatial frequency detection part 109 and gain adjustment part 110. After the output of the image signals, the process proceeds to Step S304.

In Step S304, the camera controller 116 initializes a counter (n=1). The numeric value n of the counter corresponds to a number assigned to each of n focus detection areas provided on the image-pickup element 104.

Next, in Step S305, the camera controller 116 causes the spatial frequency detection part 109 to detect a high-frequency component from the image signals of the adjacent pixels arranged in the vicinity of (around) the focus detection pixels 106 in an n-th focus detection area.

The camera controller 116 then determines whether or not the intensity of the detected high-frequency component is higher than a predetermined threshold value (predetermined value). This determination is for determining whether or not the spatial frequency of the object image formed on the n-th focus detection area has a value with which a good entire image can be obtained by performing image data interpolation by the pixel interpolation part 111 for generating image data corresponding to this focus detection area (focus detection pixels 106).

In many cases, an image signal (object image) in a state where the defocus amount is large contains a small high-frequency component (that is, a contrast of the object is low). In contrast, an image signal in a state where the defocus amount is small (that is, near an in-focus state) contains a large high-frequency component (that is, the contrast is high). As described above, when the image data interpolation by the pixel interpolation part 111 is performed in a state where the spatial frequency of the object image is low, a decrease in sharpness of the image is not prominent, while it becomes prominent when the image data interpolation is performed in a state where the spatial frequency of the object image is high.

Therefore, in this embodiment, the camera controller 116 switches whether or not to cause the pixel interpolation part 111 to perform the image data interpolation in accordance with the intensity of the spatial frequency of the object image (high-frequency component of the image signal). That is, if the detected intensity is higher than the threshold value, the process proceeds to Step S306 without performing the image data interpolation, while the process proceeds to Step S308 to perform the image data interpolation if the detected intensity is lower than the threshold value.

In Step S306, the camera controller 116 compares an average image signal of the n-th focus detection area (hereinafter referred to as "the n-th focus detection pixels 106") with an average image signal of the adjacent pixels. The camera controller 116 then causes the gain adjustment part 110 to adjust the gain to be applied to the image signals of the n-th focus detection pixels 106 so that the levels of these average image signals become equal to each other or become close to each other within a range that can be regarded as equal to each other. Instead of comparing the average image signals of the pixels, peak values of the image signals may be compared. After adjusting the gain, the process proceeds to Step S307.

In Step S307, the camera controller 116 inserts the image signals of the n-th focus detection pixels 106 which has been gain-adjusted in Step S306 into an area (or positions) corresponding to the n-th focus detection pixels 106 in an image (still image data) including the image signals of the image-pickup pixels 105 which has been obtained by the output from the image-pickup element 104. This generates synthesized image data in which an image based on the image signals from the image-pickup pixels 105 and a partial image based on the gain-adjusted image signals from the n-th focus detection pixels 106 are synthesized. The camera controller 116 outputs the synthesized image data to the image processing part 112. After that, the process proceeds to Step S310.

On the other hand, in Step S308, the camera controller 116 causes the pixel interpolation part 111 to generate partial image data for interpolation (interpolating image data) corresponding to the n-th focus detection pixels 106 through the interpolation calculation based on the image signals of the adjacent pixels to the n-th focus detection pixels 106. That is, the pixel interpolation part 111 generates, based on the outputs from the image-pickup pixels 105 (adjacent pixels), a partial image corresponding to the n-th focus detection pixels 106 in the entire image obtained by the output from the image-pickup element 104.

In this embodiment, because of a periodic color filter arrangement of the image-pickup pixels 105, it is particularly necessary to interpolate pixel signals of green components of the focus detection pixels S1 and S2 shown in FIG. 2. Therefore, the pixel signals corresponding to the positions of the focus detection pixels S1 and S2 are generated based on signals of green pixels obliquely adjacent to the focus detection pixels S1 and S2 among the adjacent pixels. The adjacent pixels used for interpolation are not limited to the green pixels obliquely adjacent to the focus detection pixels S1 and S2 as described above. That is, other green pixels located farther than the adjacent pixels may be used to perform edge detection based on positional changes in their signal levels so as to perform interpolation calculation that takes edge positions of the object image into consideration.

After generating the partial image data for interpolation, the process proceeds to Step S309.

In Step S309, the camera controller 116 inserts the image signals of the partial image data for interpolation corresponding to the n-th focus detection pixels 106 generated in Step S308 into an area (or positions) corresponding to the n-th focus detection pixels 106 in the image (still image data) including the image signals of the image-pickup pixels 105 which has been obtained by the output from the image-pickup element 104. This generates synthesized image data in which an image based on the image signals from the image-pickup pixels 105 and a partial image for interpolation corresponding to the n-th focus detection pixels 106 are synthesized. The camera controller 116 outputs the synthesized image data to the image processing part 112. After that, the process proceeds to Step S310.

In Step S310, the camera controller 116 determines whether or not the processing from Step S305 to Step S309 has been completed for all (n) focus detection areas. If the processing has not been completed for all (n) focus detection areas, the process proceeds to Step S311 where the camera controller 116 increases the counter value by one, and then the process returns to Step S305. Thereby, the above processing is performed to a next focus detection area. If, on the other hand, the above processing has been completed for all (n) focus detection areas, the process proceeds to Step S312.

In Step S312, the camera controller 116 causes the image processing part 112 to perform the gamma correction, the white balance adjustment, the resampling for display, the image compression encoding and the like to the synthesized image data. The image processing part 112 outputs image data that has been subjected to the above image processing to the display part 113. The display part 113 displays this image data so that a user can check the picked-up image.

Further, the image processing part 112 outputs the image data that has been subjected to the above image processing also to the recording part 114. The recording part 114 records this image data in the recording medium.

The above-described operation enables obtaining of a good image having high sharpness even when a large number of focus detection pixels are provided in the image-pickup element 104.

Embodiment 2

Figure 4:
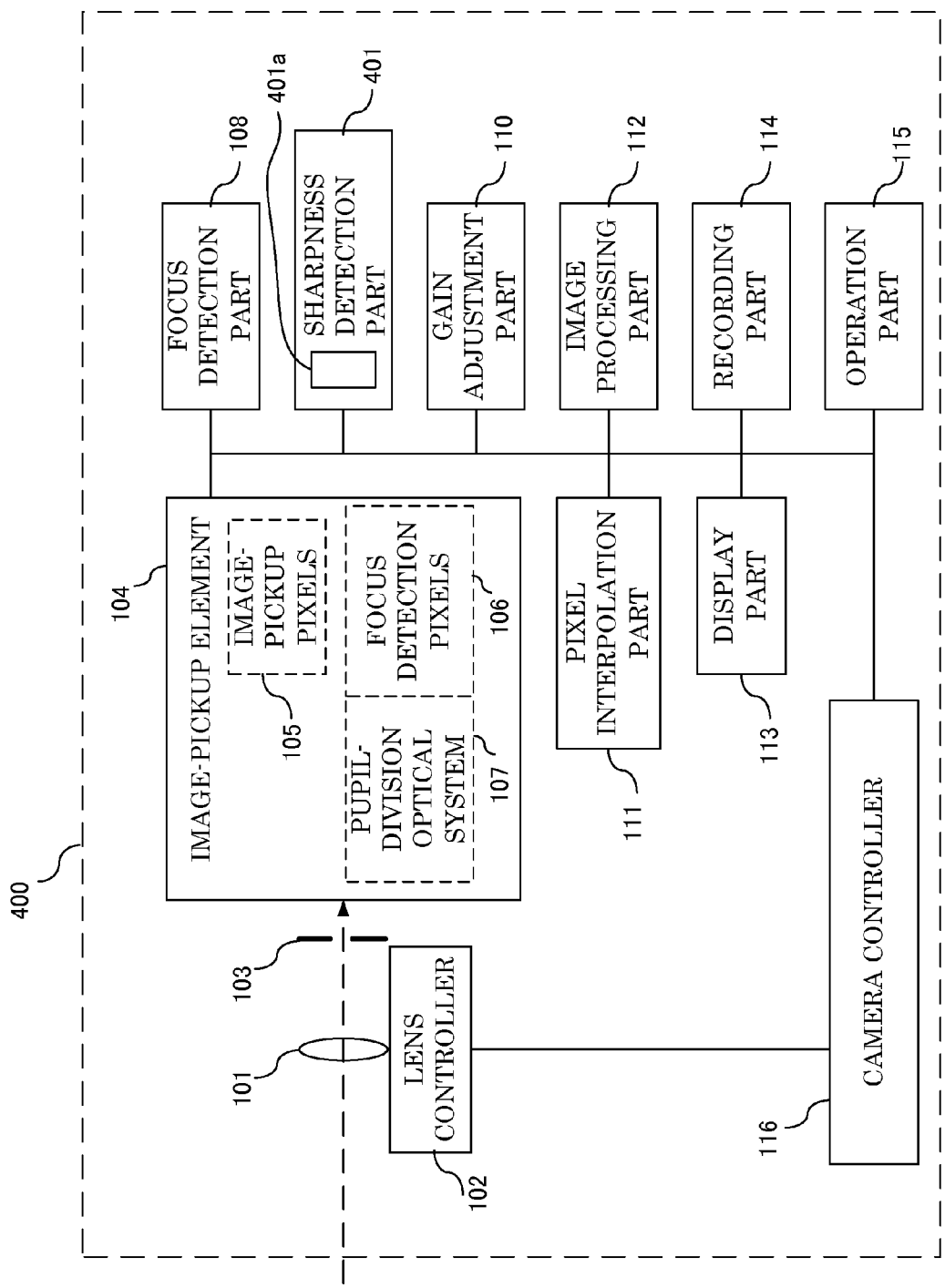
FIG. 4 is a block diagram showing the configuration of a digital camera that is a second embodiment (Embodiment 2) of the present invention.

FIG. 4 shows the configuration of a digital camera as an image-pickup apparatus that is a second embodiment (Embodiment 2) of the present invention. In this embodiment, constituent elements identical to those in Embodiment 1 are designated by the same reference numerals as those in Embodiment 1, and the descriptions thereof are omitted.

Embodiment 1 described the case where the camera 100 includes the spatial frequency detection part 109 that detects the intensity of the high-frequency component in the image signals from the adjacent pixels (image-pickup pixels 105). In contrast, the camera 400 in this embodiment uses a high-frequency component detection part 401a provided in a sharpness detection part 401 serving as a focus evaluator, instead of the spatial frequency detection part 109.

The high-frequency component detection part 401a detects (extracts) a high-frequency component contained in image signals from the image-pickup pixels 105. The sharpness detection part 401 generates focus evaluation information (AF evaluation value signal) based on the high-frequency component, and then outputs it to a camera controller 116. The focus evaluation information represents a contrast state, in other words, sharpness, of an object image.

The camera controller 116 moves a focus lens to a position where the focus evaluation information value becomes maximum to obtain an in-focus state. This is a so-called contrast detection method AF. The combination of this contrast detection method AF with the AF method using a phase difference (phase difference detection method AF) described in Embodiment 1 enables obtaining of an in-focus state with high accuracy and rapidity.

For example, the camera controller 116 first performs the focus detection using the focus detection part 108 as described in Embodiment 1 and moves the focus lens to the vicinity of an in-focus position. Next, the camera controller 116 moves the focus lens to a more accurate in-focus position using the focus evaluation information from the sharpness detection part 401.

The contrast detection method AF is also effective to maintain an in-focus state when capturing a moving image with the camera 400.

In this embodiment, the intensity of the high-frequency component in the image signals from adjacent pixels obtained by the high-frequency component detection part 401a is compared with a predetermined threshold value in Step S305 shown in FIG. 3. This provides similar effects as those of Embodiment 1.

In this embodiment, the high-frequency component whose intensity is determined in Step S305 in FIG. 3 may have a frequency range different from that of the high-frequency component used for generating the focus evaluation information. In this case, a filter coefficient used in filtering calculation performed for detection of a frequency component in the high-frequency component detection part 401a may be set such as to be switchable between when detecting a high-frequency component for determining the intensity and when detecting a high-frequency component for generating the focus evaluation information.

As described above, each of Embodiments 1 and 2 switches whether or not to generate the partial image corresponding to the second pixels in accordance with the spatial frequency component of the object image. That is, each of Embodiments 1 and 2 does not generate the partial image when the spatial frequency component of the object image is high. This enables obtaining of a good image with high sharpness even when a larger number of focus detection pixels are provided in the image-pickup element.

Embodiment 3

Figure 9:
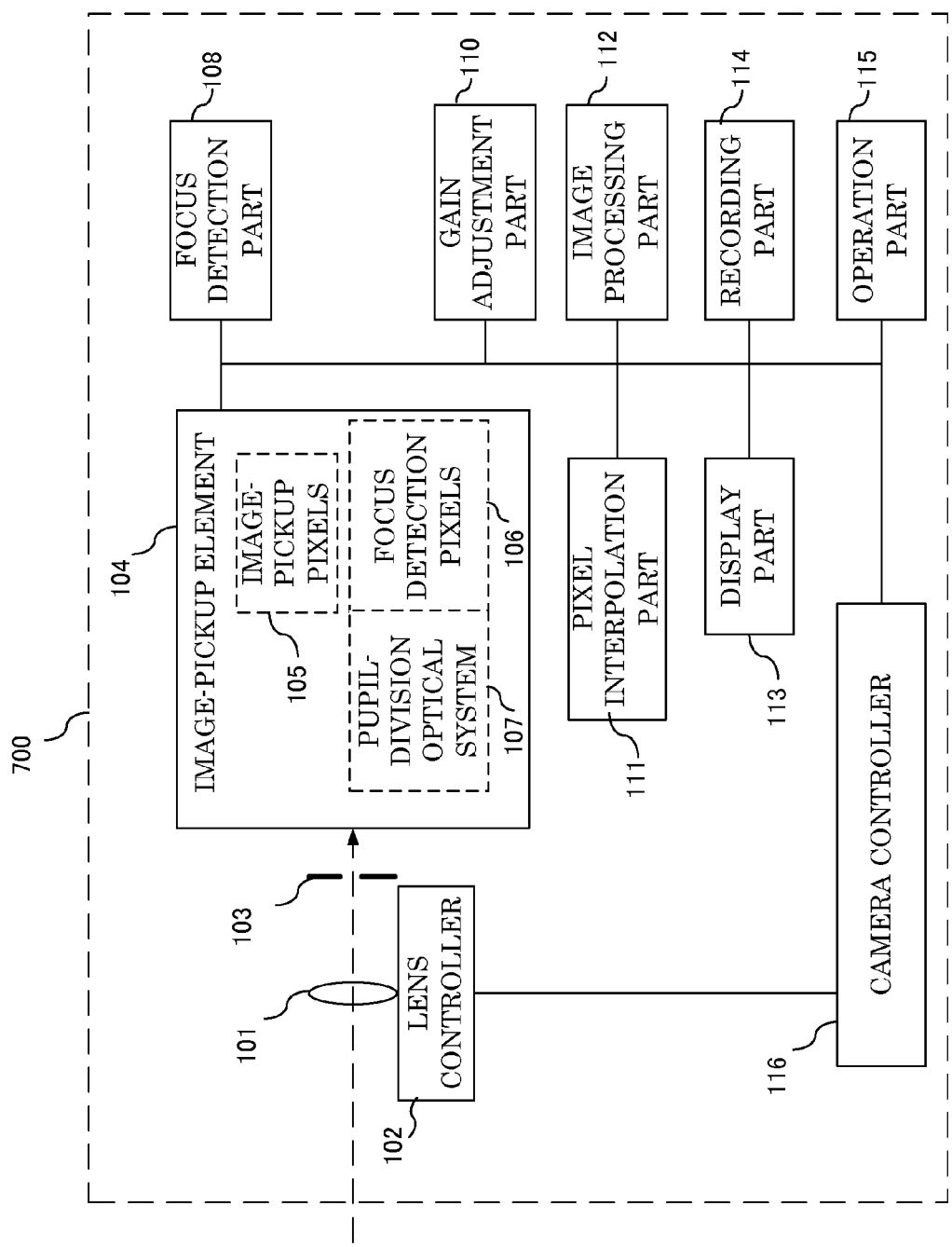
FIG. 9 is a block diagram showing the configuration of a digital camera that is a third embodiment (Embodiment 3) of the present invention.

FIG. 9 shows the configuration of a camera as an image-pickup apparatus that is a third embodiment (Embodiment 3) of the present invention. In this embodiment, constituent elements identical to or having similar functions to those in Embodiment 1 are designated by the same reference numerals as those in Embodiment 1.

The camera 700 of this embodiment does not include the spatial frequency detection part 109 described in Embodiment 1.

Figure 10:
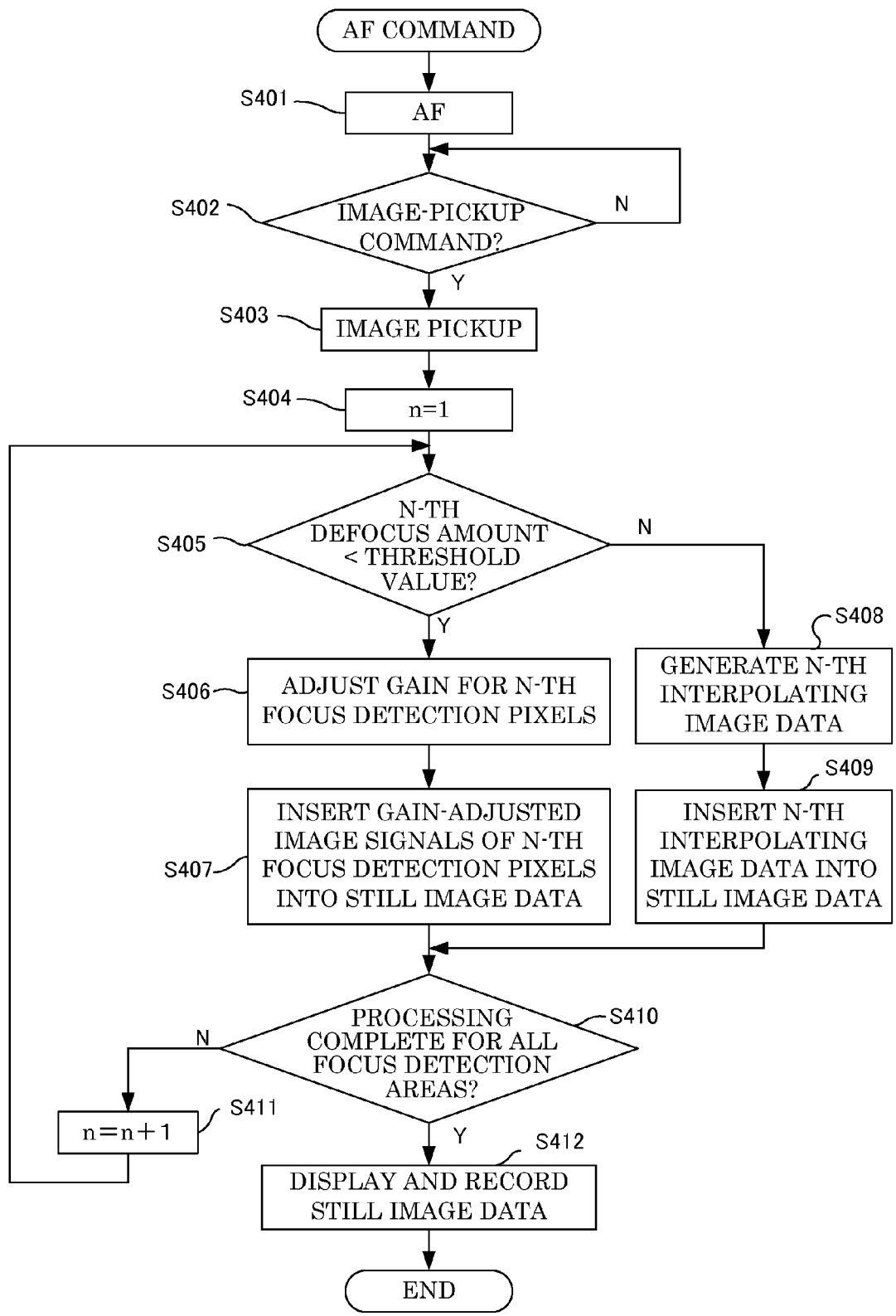
FIG. 10 is a flowchart showing the operation of the camera of Embodiment 3.

FIG. 10 shows the operation mainly of a camera controller 116 in this embodiment. This operation is executed according to a computer program stored in a memory (not shown) provided inside of the camera controller 116.

The camera controller 116 starts the operation from Step S401 when an AF command signal (for example, a signal output in response to a half-press operation of a release button, not shown) is input from an operation part 115. Although not particularly explained here, an image-pickup preparation operation including exposure calculation is performed concurrently with an AF operation.

In Step S401, the camera controller 116 causes an image-pickup element 104 to start charge accumulation in focus detection pixels 106. After completing the charge accumulation, the camera controller 116 causes the focus detection pixels 106 to output image signals to a focus detection part 108. The focus detection part 108, as described above, calculates a defocus amount and then outputs it to the camera controller 116. The camera controller 116, as described above, calculates a driving amount of a focus lens and then outputs it to a lens controller 102 to move the focus lens toward an in-focus position.

After moving the focus lens, since exposure conditions may have changed because of a change in the object image, the exposure calculation is performed again at the new focus lens position. After that, the process proceeds to Step S402.

In Step S402, the camera controller 116 determines whether or not an image-pickup command signal (for example, a signal output in response to a full-press operation of the release button) has been input thereto from the operation part 115. If no image-pickup command signal has been input, the determination in this step is repeated. If, on the other hand, the image-pickup command signal has been input, the process proceeds to Step S403.

In Step S403, the camera controller 116 causes the image-pickup element 104 to start charge accumulation in image-pickup pixels 105 and the focus detection pixels 106 for image pickup to obtain an image (image data) of an object. After completing the charge accumulation, the camera controller 116 causes the image-pickup pixels 105 to output image signals to a pixel interpolation part 111, and causes the focus detection pixels 106 to output image signals to a focus detection part 108 and a gain adjustment part 110. After this output of the image signals, the process proceeds to Step S404.

In Step S404, the camera controller 116 initializes a counter (n=1). The numeric value n of the counter corresponds to a number assigned to each of n focus detection areas provided on the image-pickup element 104.

Next, in Step S405, the camera controller 116 acquires a defocus amount in an n-th focus detection area from the focus detection part 108, and determines whether or not the defocus amount is smaller than a predetermined threshold value (predetermined value). This determination is also for determining whether or not the spatial frequency of the object image formed on the n-th focus detection area has a value with which a good entire image can be obtained by performing image data interpolation by the pixel interpolation part 111 for generating image data corresponding to this focus detection area (focus detection pixels 106).

In many cases, an image signal (object image) in a state where the defocus amount is large contains a small high-frequency component (that is, a contrast of the object is low). In contrast, an image signal in a state where the defocus amount is small (that is, near an in-focus state) contains a large high-frequency component (that is, the contrast is high). As described above, when the image data interpolation by the pixel interpolation part 111 is performed in a state where the spatial frequency of the object image is low, a decrease in sharpness of the image is not prominent, while it becomes prominent when the image data interpolation is performed in a state where the spatial frequency of the object image is high.

Therefore, in this embodiment, the camera controller 116 switches whether or not to cause the pixel interpolation part 111 to perform the image data interpolation in accordance with the defocus amount. That is, if the defocus amount is smaller than the threshold value, the process proceeds to Step S406 without performing the image data interpolation, while the process proceeds to Step S408 to perform the image data interpolation if the defocus amount is larger than the threshold value.

In Step S406, the camera controller 116 compares an average image signal of the n-th focus detection area (hereinafter referred to as "the n-th focus detection pixels 106") with an average image signal of the adjacent pixels. The camera controller 116 then causes the gain adjustment part 110 to adjust a gain to be applied to the image signals of the n-th focus detection pixels 106 so that the levels of these average image signals become equal to each other or become close to each other within a range that can be regarded as equal to each other. Instead of comparing the average image signals of the pixels, peak values of the image signals may be compared. After adjusting the gain, the process proceeds to Step S407.

In Step S407, the camera controller 116 inserts the image signals of the n-th focus detection pixels 106 which has been gain-adjusted in Step S406 into an area (or positions) corresponding to the n-th focus detection pixels 106 in an image (still image data) including the image signals of the image-pickup pixels 105 which has been obtained by the output from the image-pickup element 104. This generates synthesized image data in which an image based on the image signals from the image-pickup pixels 105 and a partial image based on the gain-adjusted image signals from the n-th focus detection pixels 106 are synthesized. The camera controller 116 outputs the synthesized image data to an image processing part 112. After that, the process proceeds to Step S410.

On the other hand, in Step S408, the camera controller 116 causes the pixel interpolation part 111 to generate partial image data for interpolation (interpolating image data) corresponding to the n-th focus detection pixels 106 through the interpolation calculation based on the image signals of the adjacent pixels to the n-th focus detection pixels 106. That is, the pixel interpolation part 111 generates, based on the outputs from the image-pickup pixels 105 (adjacent pixels), a partial image corresponding to the n-th focus detection pixels 106 in the entire image obtained by the output from the image-pickup element 104.

In this embodiment, because of a periodic color filter arrangement of the image-pickup pixels 105, it is particularly necessary to interpolate pixel signals of green components of first and second focus detection pixels S1 and S2 shown in FIG. 2. Therefore, the pixel signals corresponding to the positions of the focus detection pixels S1 and S2 are generated based on signals of green pixels obliquely adjacent to the focus detection pixels S1 and S2 among the adjacent pixels. The adjacent pixels used for interpolation are not limited to the green pixels obliquely adjacent to the focus detection pixels S1 and S2 as described above. That is, other green pixels located farther than the adjacent pixels may be used to perform edge detection based on positional changes in their signal levels so as to perform interpolation calculation that takes edge positions of the object image into consideration.

After generating the partial image data for interpolation, the process proceeds to Step S409.

In Step S409, the camera controller 116 inserts the image signals of the partial image data for interpolation corresponding to the n-th focus detection pixels 106 generated in Step S408 into an area (or positions) corresponding to the n-th focus detection pixels 106 in the image (still image data) including the image signals of the image-pickup pixels 105 which has been obtained by the output from the image-pickup element 104. This generates synthesized image data in which an image based on the image signals from the image-pickup pixels 105 and a partial image for interpolation corresponding to the n-th focus detection pixels 106 are synthesized. The camera controller 116 outputs the synthesized image data to the image processing part 112. After that, the process proceeds to Step S410.

In Step S410, the camera controller 116 determines whether or not the processing from Step S405 to Step S409 has been completed for all (n) focus detection areas. If the processing has not been completed for all (n) focus detection areas, the process proceeds to Step S411 where the camera controller 116 increases the counter value by one, and then the process returns to Step S405. Thereby, the above processing is performed to a next focus detection area. If, on the other hand, the above processing has been completed for all (n) focus detection areas, the process proceeds to Step S412.

In Step S412, the camera controller 116 causes the image processing part 112 to perform gamma correction, white balance adjustment, resampling for display, image compression encoding and the like to the synthesized image data. The image processing part 112 outputs image data that has been subjected to the above image processing to a display part 113. The display part 113 displays this image data so that a user can check the picked-up image.

Further, the image processing part 112 outputs the image data that has been subjected to the above image processing also to a recording part 114. The recording part 114 records this image data in a recording medium.

As described above, this embodiment switches whether or not to generate the partial image corresponding to the second pixels in accordance with the focus state of the image-pickup optical system. That is, this embodiment does not generate the partial image when, for example, the focus state is a state where the spatial frequency of the object image is high. This enables obtaining of a good image with high sharpness even when a larger number of focus detection pixels are provided in the image-pickup element.

Embodiment 4

Figure 11:
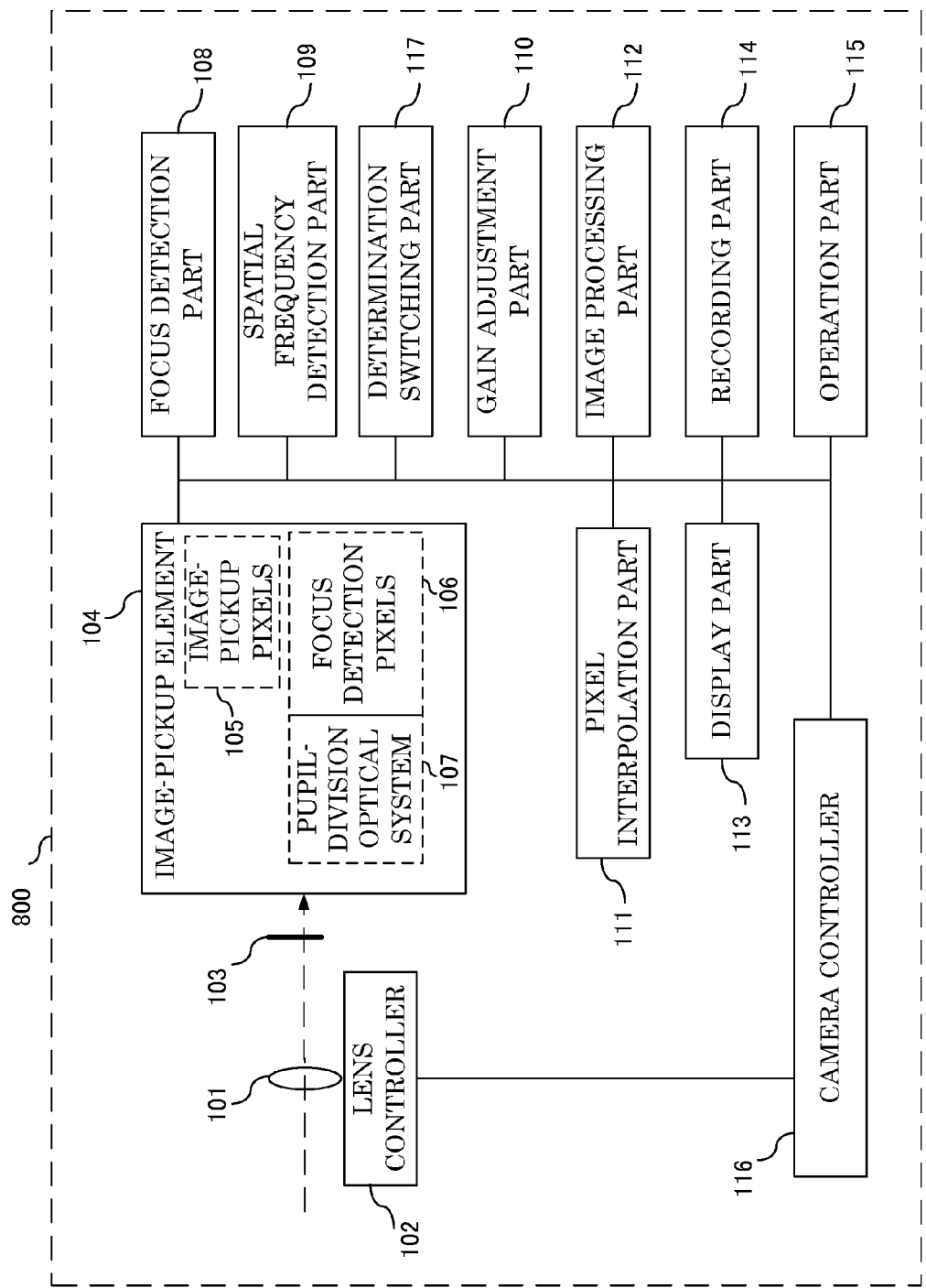
FIG. 11 is a block diagram showing the configuration of a digital camera that is a fourth embodiment (Embodiment 4) of the present invention.

FIG. 11 shows the configuration of a digital camera as an image-pickup apparatus that is a fourth embodiment (Embodiment 4) of the present invention. In this embodiment, constituent elements identical to those in Embodiment 1 are designated by the same reference numerals as those in Embodiment 1, and the descriptions thereof are omitted.

The camera 800 of this embodiment includes a determination switching part 117 in addition to the constituent elements described in Embodiment 1.

The determination switching part 117 switches between whether or not to perform interpolation processing in a pixel interpolation part 111 which will be described later in accordance with a focus state detected using focus detection pixels 106, and whether or not to perform the interpolation processing in the pixel interpolation part 111 in accordance with intensity of a high-frequency component detected by a spatial frequency detection part 109. The determination switching part 117 and a camera controller 116 form a controller.

Figure 12:
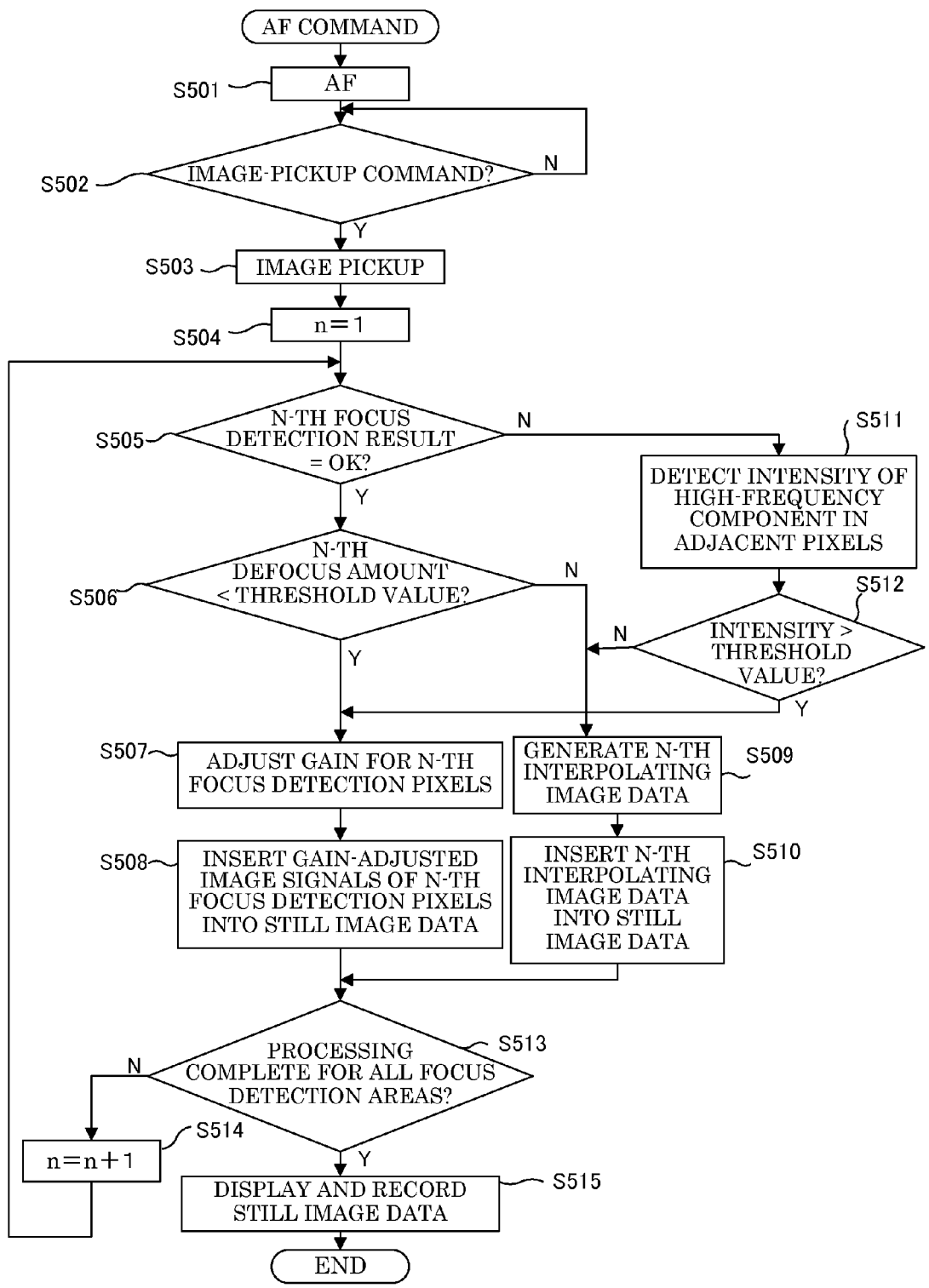
FIG. 12 is a flowchart showing the operation of the camera of Embodiment 4.

FIG. 12 shows the operation mainly of the camera controller 116 in this embodiment. This operation is executed according to a computer program stored in a memory (not shown) provided inside of the camera controller 116.

The camera controller 116 starts the operation from Step S501 when an AF command signal (for example, a signal output in response to a half-press operation of a release button, not shown) is input from an operation part 115. Although not particularly explained here, an image-pickup preparation operation including exposure calculation is performed concurrently with an AF operation.

In Step S501, the camera controller 116 causes an image-pickup element 104 to start charge accumulation in the focus detection pixels 106. After completing the charge accumulation, the camera controller 116 causes the focus detection pixels 106 to output image signals to a focus detection part 108. The focus detection part 108, as described above, calculates a defocus amount and then outputs it to the camera controller 116. The camera controller 116, as described above, calculates a driving amount of a focus lens and then outputs it to a lens controller 102 to move the focus lens toward an in-focus position.

After moving the focus lens, since exposure conditions may have changed because of a change in an object image, the exposure calculation is performed again at the new focus lens position. After that, the process proceeds to Step S502.

In Step S502, the camera controller 116 determines whether or not an image-pickup command signal (for example, a signal output in response to a full-press operation of the release button) has been input thereto from the operation part 115. If no image-pickup command signal has been input, the determination in this step is repeated. If, on the other hand, the image-pickup command signal has been input, the process proceeds to Step S503.

In Step S503, the camera controller 116 causes the image-pickup element 104 to start charge accumulation of image-pickup pixels 105 and the focus detection pixels 106 for image pickup to obtain an image (image data) of an object. After completing the charge accumulation, the camera controller 116 causes the image-pickup pixels 105 to output image signals to the spatial frequency detection part 109 and pixel interpolation part 111, and causes the focus detection pixels 106 to output image signals to the focus detection part 108 and a gain adjustment part 110. After the output of the image signals, the process proceeds to Step S504.

In Step S504, the camera controller 116 initializes a counter (n=1). The numeric value n of the counter corresponds to a number assigned to each of n focus detection areas provided on the image-pickup element 104.

In Step S505, the camera controller 116 (and the determination switching part 117) determines whether or not focus detection has succeeded in an n-th focus detection area. With the above-described focus detection method (phase difference detection method) in which a defocus amount is determined based on a phase difference of image signals obtained from the focus detection pixels, sometimes focus detection cannot be performed correctly for an object having a repeated pattern.

Failure of correct focus detection makes it impossible to determine whether or not image data interpolation can be performed in accordance with the defocus amount. Therefore, in this embodiment, in such a case, the camera controller 116 (and the determination switching part 117) determines whether or not the image data interpolation can be performed in accordance with the detected result of a high-frequency component in the spatial frequency detection part 109. This is because, if the intensity of the high-frequency component is high, the defocus amount of the image-pickup optical system 101 can be regarded as small.

When the focus detection has succeeded in the n-th focus detection area, the process proceeds to Step S506, while the process proceeds to Step S511 when the focus detection has not succeeded (or has not been performed).

In Step S506, the camera controller 116 acquires the defocus amount in the n-th focus detection area from the focus detection part 108, and then determines whether or not the defocus amount is smaller than a predetermined threshold value (first predetermined value). This determination is also for determining whether or not the spatial frequency of the object image formed on the n-th focus detection area has a value with which a good entire image can be obtained by performing the image data interpolation by the pixel interpolation part 111 for generating image data corresponding to this focus detection area (focus detection pixels 106).

In many cases, an image signal (object image) in a state where the defocus amount is large contains a small high-frequency component (that is, a contrast of the object is low). In contrast, an image signal in a state where the defocus amount is small (that is, in a state where the focus state is near an in-focus state) contains a large high-frequency component (that is, the contrast is high). As described above, when the image data interpolation by the pixel interpolation part 111 is performed in a state where the spatial frequency of the object image is low, a decrease in sharpness of the image is not prominent, while it becomes prominent when the image data interpolation is performed in a state where the spatial frequency of the object image is high.

Therefore, in this embodiment, if the focus detection has succeeded, the camera controller 116 switches whether or not to perform the image data interpolation by the pixel interpolation part 111 in accordance with the defocus amount. That is, if the defocus amount is smaller than the threshold value, the process proceeds to Step S507 without performing the image data interpolation, while the process proceeds to Step S509 to perform the image data interpolation if the defocus amount is larger than the threshold value.

In Step S507, the camera controller 116 compares an average image signal of the n-th focus detection area (hereinafter referred to as "the n-th focus detection pixels 106") with an average image signal of adjacent pixels. The camera controller 116 then causes the gain adjustment part 110 to adjust the gain to be applied to the image signals of the n-th focus detection pixels 106 so that the levels of the average image signals become equal to each other or become close to each other within a range that can be regarded as equal to each other. Instead of comparing the average image signals of the pixels, peak values of the image signals may be compared. After adjusting the gain, the process proceeds to Step S508.

In Step S508, the camera controller 116 inserts the image signals of the n-th focus detection pixels 106 which has been gain-adjusted in Step S306 into an area (or positions) corresponding to the n-th focus detection pixels 106 in an image (still image data) including the image signals of the image-pickup pixels 105 which has been obtained by the output from the image-pickup element 104. This generates synthesized image data in which an image based on the image signals from the image-pickup pixels 105 and a partial image based on the gain-adjusted image signals from the n-th focus detection pixels 106 are synthesized. The camera controller 116 outputs the synthesized image data to an image processing part 112. After that, the process proceeds to Step S513.

On the other hand, in Step S509, the camera controller 116 causes the pixel interpolation part 111 to generate partial image data for interpolation (interpolating image data) corresponding to the n-th focus detection pixels 106 through the interpolation calculation based on the image signals of the adjacent pixels to the n-th focus detection pixels 106. That is, the pixel interpolation part 111 generates, based on the outputs from the image-pickup pixels 105 (adjacent pixels), a partial image corresponding to the n-th focus detection pixels 106 in the entire image obtained by the output from the image-pickup element 104.

In this embodiment, because of a periodic color filter arrangement of the image-pickup pixels 105, it is particularly necessary to interpolate pixel signals of green components of focus detection pixels S1 and S2 shown in FIG. 2. Therefore, the pixel signals corresponding to the positions of the focus detection pixels S1 and S2 are generated based on signals of green pixels obliquely adjacent to the focus detection pixels S1 and S2 among the adjacent pixels. The adjacent pixels used for interpolation are not limited to the green pixels obliquely adjacent to the focus detection pixels S1 and S2 as described above. That is, other green pixels located farther than the adjacent pixels may be used to perform edge detection based on positional changes in their signal levels so as to perform interpolation calculation that takes edge positions of the object image into consideration.

After generating the partial image data for interpolation, the process proceeds to Step S510.

In Step S510, the camera controller 116 inserts the image signals of the partial image data for interpolation corresponding to the n-th focus detection pixels 106 generated in Step S509 into an area (or positions) corresponding to the n-th focus detection pixels 106 in the image (still image data) including the image signals of the image-pickup pixels 105 which has been obtained by the output from the image-pickup element 104. This generates synthesized image data in which an image based on the image signals from the image-pickup pixels 105 and a partial image for interpolation corresponding to the n-th focus detection pixels 106 are synthesized. The camera controller 116 outputs the synthesized image data to the image processing part 112. After that, the process proceeds to Step S513.

In Step S511, the camera controller 116 causes the spatial frequency detection part 109 to detect a high-frequency component in the image signals of the adjacent pixels to the n-th focus detection pixels 106.

In Step S512, the camera controller 116 determines whether or not the intensity of the high-frequency component detected in Step S511 is higher than a predetermined threshold value (second predetermined value).

As described above, when the intensity of the high-frequency component is higher than the threshold value (that is, a contrast of the object is high), the defocus amount of the image-pickup optical system 101 can be regarded as small. Therefore, this situation is regarded as similar to the case where the focus detection in Step S505 has succeeded and the defocus amount is smaller than the threshold value in Step S506. On the other hand, when the intensity of the high-frequency component is lower than the threshold value (the contrast is low), the defocus amount of the image-pickup optical system 101 can be regarded as large. Therefore, this situation is regarded as similar to the case where the focus detection in Step S505 has succeeded and the defocus amount is larger than the threshold value in Step S506.

That is, when the detected intensity is higher than the threshold value, the process proceeds to Step S507 without performing image data interpolation, while the process proceeds to Step S509 to perform the image data interpolation when the detected intensity is lower than the threshold value.

In Step S513, the camera controller 116 determines whether or not the processing from Step S505 to Step S512 has completed for all (n) focus detection areas.

If the processing has not been completed for all (n) focus detection areas, the process proceeds to Step S514 where the camera controller 116 increases the counter value by one, and then the process returns to Step S505. Thereby, the above processing is performed to a next focus detection area. If, on the other hand, the above processing has been completed for all (n) focus detection areas, the process proceeds to Step S515.

In Step S515, the camera controller 116 causes the image processing part 112 to perform gamma correction, white balance adjustment, resampling for display, image compression encoding and the like to the synthesized image data. The image processing part 112 outputs image data that has been subjected to the above image processing to a display part 113. The display part 113 displays this image data so that a user can check the picked-up image.

Further, the image processing part 112 outputs the image data that has been subjected to the above image processing also to a recording part 114. The recording part 114 records this image data in a recording medium.

As described above, this embodiment switches whether or not to generate the partial image corresponding to the second pixels in accordance with one of a focus state of the image-pickup optical system and a spatial frequency component of the object image. That is, this embodiment does not generate the partial image when, for example, the spatial frequency of the object image is high or the focus state is a state where such a high spatial frequency can be obtained. This enables obtaining of a good image with high sharpness even when a larger number of focus detection pixels are provided in the image-pickup element.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application Nos. 2007-209697, filed on Aug. 10, 2007, 2007-209698, filed on Aug. 10, 2007 and 2007-209699, Filed on Aug. 10, 2007 which are hereby incorporated by reference herein in their entirety.

INDUSTRIAL APPLICABILITY

An image-pickup apparatus is provided which is capable of obtaining a good image with high sharpness even when a large number of focus detection pixels are provided in an image-pickup element.

The invention claimed is:

1. An image-pickup apparatus, comprising:
an image-pickup element that includes first pixels photoelectrically converting an object image formed by a light flux from an image-pickup optical system, and second pixels including plural focus detection pixels photoelectrically converting a light flux divided from the light flux from the image-pickup optical system;
a focus detector that detects a focus state of the image-pickup optical system based on outputs from the second pixels;
a frequency component detector that detects a spatial frequency component of the object image formed on the first pixels;
an image generator that generates, based on outputs from the first pixels, a partial image corresponding to the second pixels of an image obtained by an output from the image-pickup element; and
a controller that switches whether or not to cause the image generator to generate the partial image in accordance with the spatial frequency component detected by the frequency component detector,
wherein the controller does not cause the image generator to generate the partial image when an intensity of the spatial frequency component is higher than a predetermined value, and causes the image generator to generate the partial image when the intensity of the spatial frequency component is lower than the predetermined value.

2. An image-pickup apparatus, comprising:
an image-pickup element that includes first pixels photoelectrically converting an object image formed by a light flux from an image-pickup optical system, and second pixels including plural focus detection pixels photoelectrically converting a light flux divided from the light flux from the image-pickup optical system;
a focus detector that detects a focus state of the image-pickup optical system based on outputs from the second pixels;
a frequency component detector that detects a spatial frequency component of the object image formed on the first pixels;
an image generator that generates, based on outputs from the first pixels, a partial image corresponding to the second pixels of an image obtained by an output from the image-pickup element;
a controller that switches whether or not to cause the image generator to generate the partial image in accordance with the spatial frequency component detected by the frequency component detector; and
an adjuster that performs a gain adjustment for the outputs from the second pixels,
wherein the controller causes the adjuster to perform the gain adjustment when the controller does not cause the image generator to generate the partial image.

3. An image-pickup apparatus according to claim 1, further comprising a focus evaluator that detects frequency components included in the outputs from the first pixels to generate focus evaluation information corresponding to a contrast state of the object image, wherein the focus evaluator is used as the frequency component detector.

4. A method of controlling an image-pickup element including first pixels photoelectrically converting an object image formed by a light flux from an image-pickup optical system, and second pixels including plural focus detection pixels photoelectrically converting a light flux divided from the light flux from the image-pickup optical system, the method comprising steps of:
detecting a focus state of the image-pickup optical system based on outputs from the second pixels;
detecting a spatial frequency component of the object image formed on the first pixels;
generating, based on outputs from the first pixels, a partial image corresponding to the second pixels of an image obtained by an output from the image-pickup element; and
switching whether or not to generate the partial image in accordance with the detected spatial frequency component,
wherein the partial image is not generated when an intensity of the spatial frequency component is higher than a predetermined value, and is generated when the intensity of the spatial frequency component is lower than the predetermined value.

5. An image-pickup apparatus, comprising:
an image-pickup element that includes first pixels photoelectrically converting an object image formed by a light flux from an image-pickup optical system, and second pixels including plural focus detection pixels photoelectrically converting a light flux divided from the light flux from the image-pickup optical system;
a focus detector that detects a focus state of the image-pickup optical system based on outputs from the second pixels;
an image generator that generates, based on outputs from the first pixels, a partial image corresponding to the second pixels of an image obtained by an output from the image-pickup element; and
a controller that switches whether or not to cause the image generator to generate the partial image in accordance with the focus state detected by the focus detector,
wherein the controller does not cause the image generator to generate the partial image when a defocus amount representing the focus state is smaller than a predetermined value, and causes the image generator to generate the partial image when the defocus amount is larger than the predetermined value.

6. An image-pickup apparatus, comprising:
an image-pickup element that includes first pixels photoelectrically converting an object image formed by a light flux from an image-pickup optical system, and second pixels including plural focus detection pixels photoelectrically converting a light flux divided from the light flux from the image-pickup optical system;
a focus detector that detects a focus state of the image-pickup optical system based on outputs from the second pixels;
an image generator that generates, based on outputs from the first pixels, a partial image corresponding to the second pixels of an image obtained by an output from the image-pickup element;
a controller that switches whether or not to cause the image generator to generate the partial image in accordance with the focus state detected by the focus detector; and
an adjuster that performs a gain adjustment for the outputs from the second pixels,
wherein the controller causes the adjuster to perform the gain adjustment when the controller does not cause the image generator to generate the partial image.

7. A method of controlling an image-pickup apparatus that includes an image-pickup element including first pixels photoelectrically converting an object image formed by a light flux from an image-pickup optical system, and second pixels containing plural focus detection pixels photoelectrically converting a light flux divided from the light flux from the image-pickup optical system, the method comprising steps of:

detecting a focus state of the image-pickup optical system based on outputs from the second pixels;

generating, based on outputs from the first pixels, a partial image corresponding to the second pixels of an image obtained by an output from the image-pickup element; and switching whether or not to generate the partial image in accordance with the detected focus state, wherein the partial image is not generated when a defocus amount representing the focus state is smaller than a predetermined value, and is generated when the defocus amount is larger than the predetermined value.

8. An image-pickup apparatus, comprising:

an image-pickup element that includes first pixels photoelectrically converting an object image formed by a light flux from an image-pickup optical system, and second pixels containing plural focus detection pixels photoelectrically converting a light flux divided from the light flux from the image-pickup optical system;

a focus detector that detects a focus state of the image-pickup optical system based on outputs from the second pixels;

a frequency component detector that detects a spatial frequency component of the object image formed on the first pixels;

an image generator that generates, based on outputs from the first pixels, a partial image corresponding to the second pixels of an image obtained by an output from the image-pickup element; and a controller that switches whether or not to cause the image generator to generate the partial image in accordance with the detected focus state when the focus detector has detected the focus state, and switches whether or not to cause the image generator to generate the partial image in accordance with the spatial frequency component detected by the frequency component detector when the focus detector has not detected the focus state, wherein the controller does not cause the image generator to generate the partial image when a defocus amount representing the focus state is smaller than a first predetermined value, and causes the image generator to generate the partial image when the defocus amount is larger than the first predetermined value, and wherein the controller does not cause the image generator to generate the partial image when an intensity of the spatial frequency component is higher than a second predetermined value, and causes the image generator to generate the partial image when the intensity of the spatial frequency component is lower than the second predetermined value.

9. An image-pickup apparatus, comprising:

an image-pickup element that includes first pixels photoelectrically converting an object image formed by a light flux from an image-pickup optical system, and second pixels containing plural focus detection pixels photoelectrically converting a light flux divided from the light flux from the image-pickup optical system;

a focus detector that detects a focus state of the image-pickup optical system based on outputs from the second pixels;

a frequency component detector that detects a spatial frequency component of the object image formed on the first pixels;

an image generator that generates, based on outputs from the first pixels, a partial image corresponding to the second pixels of an image obtained by an output from the image-pickup element;

a controller that switches whether or not to cause the image generator to generate the partial image in accordance with the detected focus state when the focus detector has detected the focus state, and switches whether or not to cause the image generator to generate the partial image in accordance with the spatial frequency component detected by the frequency component detector when the focus detector has not detected the focus state; and an adjuster that performs a gain adjustment for the outputs from the second pixels, wherein the controller causes the adjuster to perform the gain adjustment when the controller does not cause the image generator to generate the partial image.

10. A method of controlling an image-pickup apparatus that includes an image-pickup element including first pixels photoelectrically converting an object image formed by a light flux from an image-pickup optical system, and second pixels containing plural focus detection pixels photoelectrically converting a light flux divided from the light flux from the image-pickup optical system, the method comprising steps of:

detecting a focus state of the image-pickup optical system based on outputs from the second pixels;

detecting a spatial frequency component of the object image formed on the first pixels;

generating, based on outputs from the first pixels, a partial image corresponding to the second pixels of an image obtained by an output from the image-pickup element; and switching whether or not to generate the partial image in accordance with the detected focus state when the focus state has been detected, and switches whether or not to generate the partial image in accordance with the detected spatial frequency component when the focus state has not been detected, wherein the partial image is not generated when a defocus amount representing the focus state is smaller than a first predetermined value, and is generated when the defocus amount is larger than the first predetermined value, and wherein the partial image is not generated when an intensity of the spatial frequency component is higher than a second predetermined value, and is generated when the intensity of the spatial frequency component is lower than the second predetermined value.

11. The image-pickup apparatus according to claim 2, further comprising a focus evaluator that detects frequency components included in the outputs from the first pixels to generate focus evaluation information corresponding to a contrast state of the object image, wherein the focus evaluator is used as the frequency component detector.

12. A method of controlling an image-pickup apparatus that includes an image-pickup element including first pixels photoelectrically converting an object image formed by a light flux from an image-pickup optical system, and second pixels including plural focus detection pixels photoelectrically converting a light flux divided from the light flux from the image-pickup optical system, the method comprising steps of:

detecting a focus state of the image-pickup optical system based on outputs from the second pixels;

detecting a spatial frequency component of the object image formed on the first pixels;

generating, based on outputs from the first pixels, a partial image corresponding to the second pixels of an image obtained by an output from the image-pickup element;

switching whether or not to generate the partial image in accordance with the detected spatial frequency component; and performing a gain adjustment for the outputs from the second pixels, wherein the gain adjustment is performed when the partial image is not generated.

13. A method of controlling an image-pickup apparatus that includes an image-pickup element including first pixels photoelectrically converting an object image formed by a light flux from an image-pickup optical system, and second pixels containing plural focus detection pixels photoelectrically converting a light flux divided from the light flux from the image-pickup optical system, the method comprising steps of:

detecting a focus state of the image-pickup optical system based on outputs from the second pixels;

generating, based on outputs from the first pixels, a partial image corresponding to the second pixels of an image obtained by an output from the image-pickup element;

switching whether or not to generate the partial image in accordance with the detected focus state; and performing a gain adjustment for the outputs from the second pixels, wherein the gain adjustment is performed when the partial image is not generated.

14. A method of controlling an image-pickup apparatus that includes an image-pickup element including first pixels photoelectrically converting an object image formed by a light flux from an image-pickup optical system, and second pixels containing plural focus detection pixels photoelectrically converting a light flux divided from the light flux from the image-pickup optical system, the method comprising steps of:

detecting a focus state of the image-pickup optical system based on outputs from the second pixels;

detecting a spatial frequency component of the object image formed on the first pixels;

generating, based on outputs from the first pixels, a partial image corresponding to the second pixels of an image obtained by an output from the image-pickup element;

switching whether or not to generate the partial image in accordance with the detected focus state when the focus state has been detected, and switches whether or not to generate the partial image in accordance with the detected spatial frequency component when the focus state has not been detected; and performing a gain adjustment for the outputs from the second pixels, wherein the gain adjustment is performed when the partial image is not generated.

* * * * *